United States Patent
Garrido Segura et al.

(10) Patent No.: US 10,794,557 B2
(45) Date of Patent: Oct. 6, 2020

(54) DAYLIGHTING PANEL

(71) Applicant: BASF SE, Ludwigshafen am Rhein (DE)

(72) Inventors: Cristobal Garrido Segura, Ludwigshafen am Rhein (DE); Tobias Hintermann, Therwil (CH); Andre Kostro, Basel (CH); Tatjana Vetter, Ludwigshafen am Rhein (DE)

(73) Assignee: BASF SE (DE)

( * ) Notice: Subject to any disclaimer, the term of this patent is extended or adjusted under 35 U.S.C. 154(b) by 0 days.

(21) Appl. No.: 16/346,606

(22) PCT Filed: Nov. 2, 2017

(86) PCT No.: PCT/IB2017/056813
§ 371 (c)(1),
(2) Date: May 1, 2019

(87) PCT Pub. No.: WO2018/083617
PCT Pub. Date: May 11, 2018

(65) Prior Publication Data
US 2019/0285238 A1    Sep. 19, 2019

(30) Foreign Application Priority Data

Nov. 3, 2016 (EP) ..................................... 16197138
Apr. 7, 2017 (EP) ..................................... 17165476
Aug. 7, 2017 (EP) ..................................... 17185166

(51) Int. Cl.
*F21S 11/00* (2006.01)
*E04C 1/42* (2006.01)
(Continued)

(52) U.S. Cl.
CPC ............... *F21S 11/002* (2013.01); *E04C 1/42* (2013.01); *E04C 2/54* (2013.01); *E04D 13/033* (2013.01);
(Continued)

(58) Field of Classification Search
CPC .............................. F21S 11/002; F21S 11/007
(Continued)

(56) References Cited

U.S. PATENT DOCUMENTS 4,379,613 A    4/1983 Coburn
4,389,085 A    6/1983 Mori
(Continued)

FOREIGN PATENT DOCUMENTS

CN    101680631 A    3/2010
CN    101946333 A    1/2011
(Continued)

OTHER PUBLICATIONS

Darula, et al., "Modelling of Daylight Sources in the Artificial Sky", Applied Mechanics and Materials, 2017, vol. 861, , pp. 469-476.
(Continued)

*Primary Examiner* — Christopher E Mahoney
(74) *Attorney, Agent, or Firm* — Faegre Drinker Biddle & Reath LLP

(57) ABSTRACT

A daylighting panel for integration into a building or larger vehicle comprises a translucent facade element (800) containing a glass sheet and a light transport channel (801) for guiding light about horizontally into an interior of the building, the light transport channel comprising one opening attached to the interior side of said facade element and at least one opening towards the interior of the building equipped with a luminaire (807), characterised in that the inner walls including the rear end are covered by a reflecting layer (808).

24 Claims, 5 Drawing Sheets

Figure 1A:
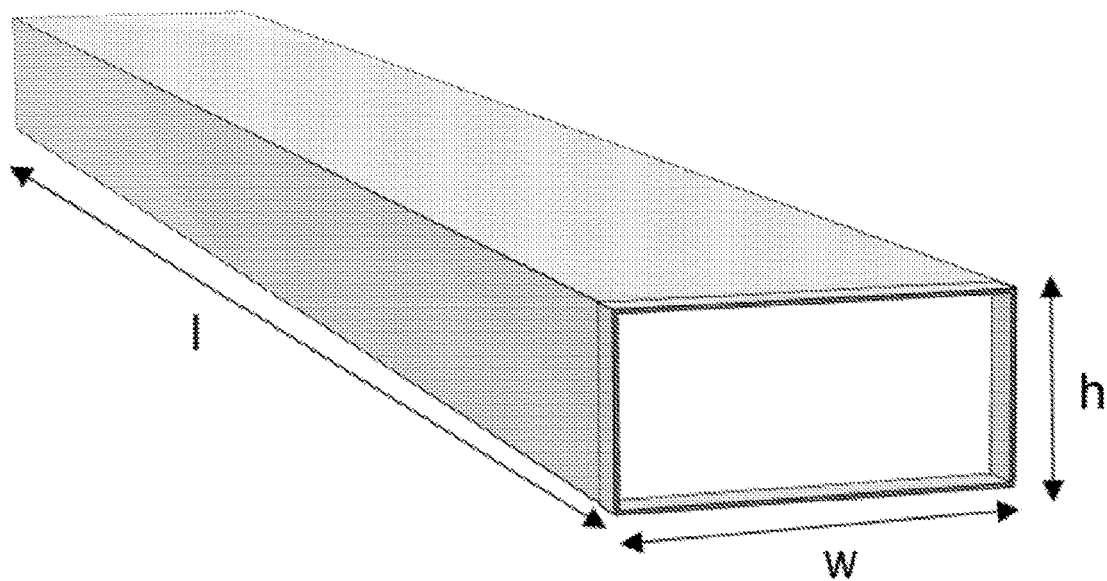

(51) Int. Cl.
*F21V 8/00* (2006.01)
*E04D 13/03* (2006.01)
*E04C 2/54* (2006.01)

(52) U.S. Cl.
CPC ............ *F21S 11/007* (2013.01); *G02B 6/005* (2013.01); *G02B 6/0028* (2013.01); *G02B 6/0055* (2013.01); *G02B 6/0056* (2013.01); *G02B 6/0066* (2013.01); *G02B 6/0095* (2013.01); *G02B 6/0045* (2013.01)

(58) Field of Classification Search
USPC .................................................. 359/591–592
See application file for complete search history.

(56) References Cited

U.S. PATENT DOCUMENTS

| | | | |
|---|---|---|---|
| 4,539,625 | A | 9/1985 | Bornstein et al. |
| 5,581,447 | A | 12/1996 | Raasakka |
| 5,709,456 | A | 1/1998 | Smith et al. |
| 6,059,438 | A | 5/2000 | Smith et al. |
| 6,201,643 | B1 | 3/2001 | Carlson |
| 6,270,240 | B1 * | 8/2001 | Inoue ..................... B60J 3/0217 362/141 |
| 6,341,041 | B1 * | 1/2002 | Carlson ................... F21S 11/00 359/591 |
| 7,873,257 | B2 | 1/2011 | Morgan |
| 8,743,462 | B2 * | 6/2014 | Freier ................. G02B 19/0023 359/596 |
| 8,955,269 | B2 | 2/2015 | Rillie |
| 8,995,059 | B2 * | 3/2015 | Padiyath .............. G02B 5/0242 359/592 |
| 9,188,296 | B2 * | 11/2015 | Gommans ................. F21V 5/00 |
| 9,229,144 | B2 | 1/2016 | Ghosh et al. |
| 9,246,038 | B2 | 1/2016 | Moore et al. |
| 9,464,773 | B2 * | 10/2016 | Geisler .................. F21S 8/026 |
| 9,482,871 | B2 * | 11/2016 | Lam .................. H01L 31/02325 |
| 9,644,808 | B1 * | 5/2017 | Huang ................... F21S 11/007 |
| 9,835,302 | B1 * | 12/2017 | Reed, II ................. F21S 11/007 |
| 10,156,069 | B1 * | 12/2018 | Turner ...................... E04B 7/02 |
| 2002/0159154 | A1 | 10/2002 | Milner |
| 2009/0126792 | A1 | 5/2009 | Gruhlke et al. |
| 2009/0199893 | A1 | 8/2009 | Bita et al. |
| 2010/0037954 | A1 | 2/2010 | Thony |
| 2010/0172147 | A1 | 7/2010 | Whang et al. |
| 2012/0006382 | A1 | 1/2012 | Dagli et al. |
| 2012/0057350 | A1 | 3/2012 | Freier et al. |
| 2012/0141068 | A1 | 6/2012 | Nyhart, Jr. |
| 2013/0135744 | A1 | 5/2013 | Jaster |
| 2014/0160570 | A1 | 6/2014 | Jaster |
| 2015/0022895 | A1 | 1/2015 | Hubertus |
| 2015/0267885 | A1 | 9/2015 | Freier et al. |
| 2016/0178879 | A1 | 6/2016 | Ford et al. |
| 2016/0276514 | A1 | 9/2016 | Simavoryan et al. |
| 2017/0023197 | A1 | 1/2017 | Ueki et al. |
| 2017/0307789 | A1 | 10/2017 | Nirmal et al. |
| 2017/0363789 | A1 | 12/2017 | Stalder et al. |

FOREIGN PATENT DOCUMENTS

| | | | | |
|---|---|---|---|---|
| CN | 102305380 | A | 1/2012 | |
| CN | 203162829 | U | 8/2013 | |
| CN | 104769355 | A | 7/2015 | |
| DE | 3522717 | A1 | 10/1986 | |
| DE | 3604269 | A1 | 8/1987 | |
| EP | 1306606 | A1 | 5/2003 | |
| EP | 2061092 | A1 | 5/2009 | |
| JP | H11-2778 | A | 1/1999 | |
| JP | 2003-215348 | A | 7/2003 | |
| JP | 2008-304795 | A | 12/2008 | |
| JP | 2011-060784 | | * 3/2011 | ............ F21S 11/00 |
| JP | 2014209423 | A | 11/2014 | |
| JP | 2014209424 | A | 11/2014 | |
| JP | 2016-031808 | A | 3/2016 | |
| JP | 2016048618 | A | 4/2016 | |
| JP | 6192535 | B2 | 9/2017 | |
| KR | 20030000943 | A | 1/2003 | |
| KR | 100384277 | B1 | 5/2003 | |
| KR | 20130099550 | A | 9/2013 | |
| TW | 201631081 | A | 9/2016 | |
| WO | WO-98028645 | A1 | 7/1998 | |
| WO | WO-2009035986 | A3 | 5/2009 | |
| WO | WO-2011022274 | A1 | 2/2011 | |
| WO | WO-2012144268 | A1 | 10/2012 | |
| WO | WO-2012176126 | A1 | 12/2012 | |
| WO | WO-2014024146 | A1 | 2/2014 | |
| WO | WO-2014070495 | A1 | 5/2014 | |
| WO | WO-2014070498 | A1 | 5/2014 | |
| WO | WO-2015098209 | A1 | 7/2015 | |
| WO | WO-2015/156225 | A1 | 10/2015 | |
| WO | WO-2016064669 | A1 | 4/2016 | |

OTHER PUBLICATIONS

European Search Report for EP Patent Application No. 16197138.7, dated Mar. 14, 2017, 4 pages.
European Search Report for EP Patent Application No. 17165476.7, dated Nov. 24, 2017, 3 pages.
Garcia H., et al., "Natural illumination of deep-plan office buildings : light pipe strategies", ISES Solar World Congress, , 2003, pp. 1-8.
Molini, D., et al., "ADASY (Active Daylighting System)", Proceedings vol. 7410, Optical Modeling and Measurements for Solar Energy Systems III, 74100H, 2009, pp. 1-8.
International Search Report for PCT/IB2017/056806 dated Feb. 22, 2018.
International Search Report for PCT/IB2017/056813 dated Feb. 23, 2018.
Written Opinion of the International Searching Authority for PCT/IB2017/056806 dated Feb. 22, 2018.
Written Opinion of the International Searching Authority for PCT/IB2017/056813 dated Feb. 23, 2018.

* cited by examiner

DAYLIGHTING PANEL

CROSS-REFERENCE TO RELATED APPLICATIONS

This application is a national stage application (under 35 U.S.C. § 371) of PCT/IB2017/056813, filed Nov. 2, 2017, which claims benefit of European Application Nos. 16197138.7, 17165476.7, and 17185166.0, filed Nov. 3, 2016, Apr. 7, 2017, and Aug. 7, 2017 respectively, all of which are incorporated herein by reference in their entirety.

The present invention relates to daylight illumination of interior rooms with insufficient daylight, typically in buildings. In particular, it relates to a mirrored light transportation channel suitable for horizontal mounting under the ceiling, whose front end is sealed to the interior side of the building's facade. The other end of the transportation channel extends into the interior of the building; its side wall, especially the side wall facing the floor, comprises one or more openings equipped with luminaires. The invention further relates to a daylight illumination system comprising such channel, and to a building with such daylight illumination system.

BACKGROUND OF THE INVENTION

Daylighting systems based on mirror lined duct light transport elements are well known in the form of vertical light tubes for light transport from the roof to the upper floors of a building; such systems are described e.g. in U.S. Pat. No. 8,955,269, WO 2011/022274, US 2014/0160570, or EP 1306606. Systems of this class are of only minor interest for multistory office buildings, where distances from the roof to the offices are mostly too long to provide the required light intensity of 500 lx in the central working region (DIN EN 12464-1, office illumination).

In order to transport daylight from the sun exposed facade into the deep of the building, devices have been proposed involving elements protruding from the facade for collecting the sunlight and guiding it into horizontal light tubes, as suggested in CN 102305380, CN203162829U, JP 2014/209423, JP 2014/209424, JP 2016/048618 and WO 1998/028645; an overview is given by V. Garcia Hansen and I. Edmonds in 'Natural illumination of deep-plan office buildings: light pipe strategies, ISES Solar World Congress 2003, 1-8; and by D. Vázquez-Molini et al., Proc. of SPIE Vol. 7410, 74100H (2009)). Such devices not only introduce aesthetical breaks into the facade, but also interrupt the building envelope and its thermal shielding.

It has now been found that, surprisingly, a high light intensity may be obtained at large distances from the building's sun exposed facade, e.g. up to 12 m or 15 m or 18 m, depending on the dimensions and especially the height of the light tube, by attaching a mirrored duct to a transparent facade element (such as a borrowed light) under the floor ceiling, which duct is equipped with openings and fitted luminaires on its end extending into the interior of the building. The illumination system thus obtained does not interrupt the facade; the building envelope remains unimpaired.

The invention thus primarily pertains to a daylight illumination system comprising a light transport tube for horizontal integration into a building, the light transport tube having a front end and a rear end, wherein the rear end is sealed, the inner walls including the rear end are equipped with a reflecting layer, and a side wall contains one or more openings each of which is sealed with a luminaire, characterized in that the open front end is suitable for sealing to the inner side of a flat transparent facade element of the building, or the front end is sealed to a transparent front plate suitable for integration into the building's facade.

The terms "about" or "approximately" in the context of the present invention denote an interval of accuracy that the person skilled in the art will understand to still ensure the technical effect of the feature in question. The term typically indicates deviation from the indicated numerical value of ±20%, preferably ±15%, more preferably ±10%, and even more preferably ±5%. The term "about" is synonymous to "essentially" and denotes a possible deviation from the basic value as noted above, except in case of angles, where the term "about" denotes a possible deviation by plus or minus 10 degrees (preferably up to plus or minus 5 degrees). Thus, the term "about horizontal" denotes an alignment (e.g. of the light transport channel) with a maximal inclination of plus or minus 10 degrees, and preferably plus or minus 5 degrees, from the horizontal.

Technical terms are used by their common sense. If a specific meaning is conveyed to certain terms, definitions of terms will be given in the following in the context of which the terms are used. The terms "mirror lined duct", "light duct", "light transport tube", "light transport channel", "light channel", "light tube" are used synonymously.

The term "specular reflection" refers to reflection without creation of diffuse light.

The angle of light incidence (or solar angle) is the angle between incoming light through a clear transparent front plate and the extension (I) of the light transport channel.

Unless explained otherwise, the term "reflectivity" denotes the average reflectivity of visible light (specifically sunlight, from the spectral range 400 to 700 nm) over all angles of incidence, polarizations and wavelengths.

The term "diffuseness" denotes the part of light converted into diffuse light after 1 reflection. The diffuseness angle denotes the maximal deviation from specular reflection of such diffused light. On some reflecting layers, diffuse reflection occurs in all directions; on other layers, diffuse reflection is limited to a smaller diffuseness angle, which may be isotropic, or diffuse reflection may show a preferential direction wherein a larger diffuseness angle occurs than in other directions. The reflecting layer in the present light transport channel preferably shows a diffuseness from the range 0.1 to 10%, for example from the range 1 to 6%; most preferably providing at least 95% directed reflection and less than 5% diffuse reflection. The diffuseness angle is preferably less than 15°, especially preferred is a diffuseness occuring in preferential direction of the extension of the light channel length l, e.g. with an angle of diffuseness from the range 5° to 15°, while the diffuseness angle for light incident in direction of the height h or width w of the light channel is smaller, e.g. 0 to 5 degrees.

Advantageously, the reflecting layer used in the present light transport channel provides reflectivity with low color shift. Preferred materials for such a layer show a Fidelity Index Rf of 90 or more, and a Gamut Index Rg from the range 95 to 105 (values to be determined in accordance with IES TM-30-15 [issued 2015]; Rf characterizes the average color shift of the 99 CES to characterize the overall level of similarity between the test source and reference illuminant with values ranging from 0 to 100; a neutral score for Rg is 100, with values greater than 100 indicating an increase in saturation and values less than 100 indicating a decrease in saturation; see U.S. Department of Energy, Evaluating Color Rendition Using IES TM-30-15, document No. PNNL-SA-114005 of October 2015).

The transparent front plate of the present system may be integrated as a facade element without protruding, thus becoming part of the building envelope functionally as well as aesthetically, typically as part of a glass facade or as a borrowed light above the room window. Thus, the facade element (with its surface typically defined by height h and width w as depicted in FIG. 1a) generally may be arranged parallel to the facade. The transparent front plate typically is a transparent façade element, which does not contain any added light redirecting element. For example, the transparent front plate may be a window with standard single, double or triple glazing.

In general, the present system, its front plate and facade element attached to the channel's front end, does not include any light collector or light redirecting element, or glass sheet with film or sheet comprising a light redirecting element attached to it, as part of the front plate or facade element.

The present light transport channel is fitted, with its front opening, to the transparent or translucent façade element from the inside of the building, thus preserving heat management properties of the building envelope, and the façade's aesthetical appearance. The present light transport channel may be fitted to the façade element such that its front opening (cross section) is sealed to said façade element, or the light transport channel is merely arranged behind the façade element in order to allow light entry from the façade element into its front opening, which may be sealed by a separate transparent sheet such as a polymer sheet or glass sheet.

Figure 1B:
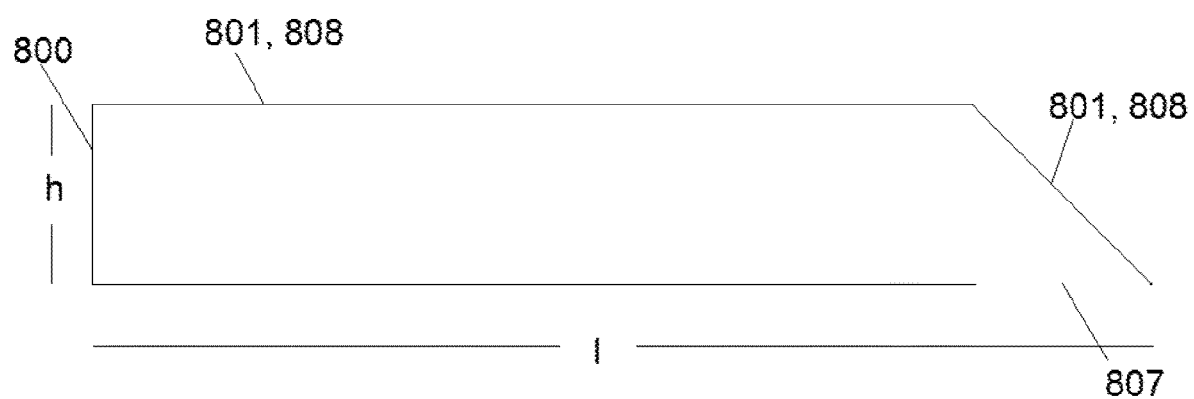
Figure 2:
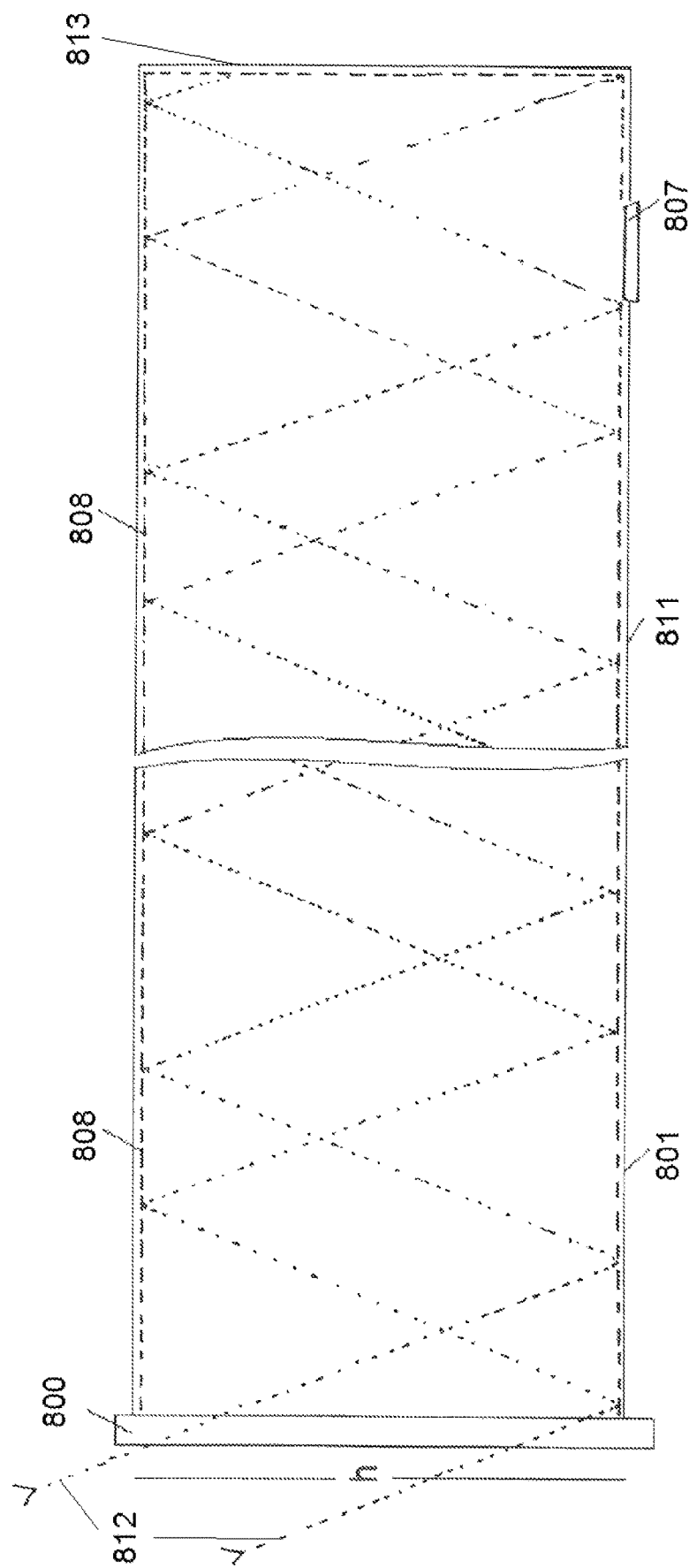
Figure 3:
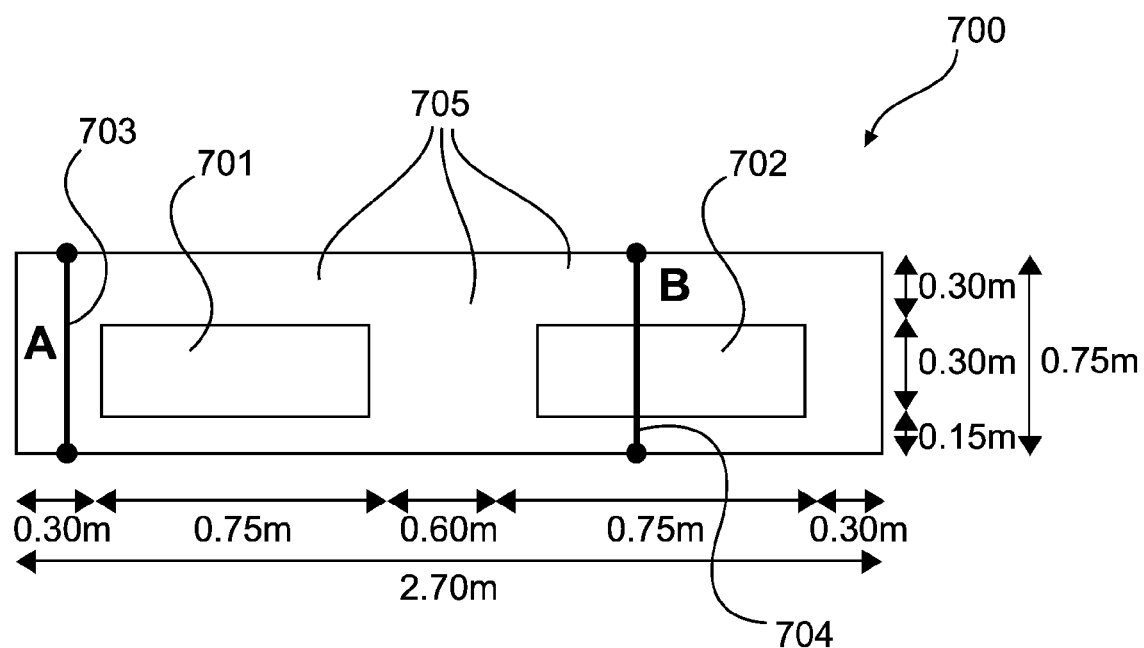
Figure 4:
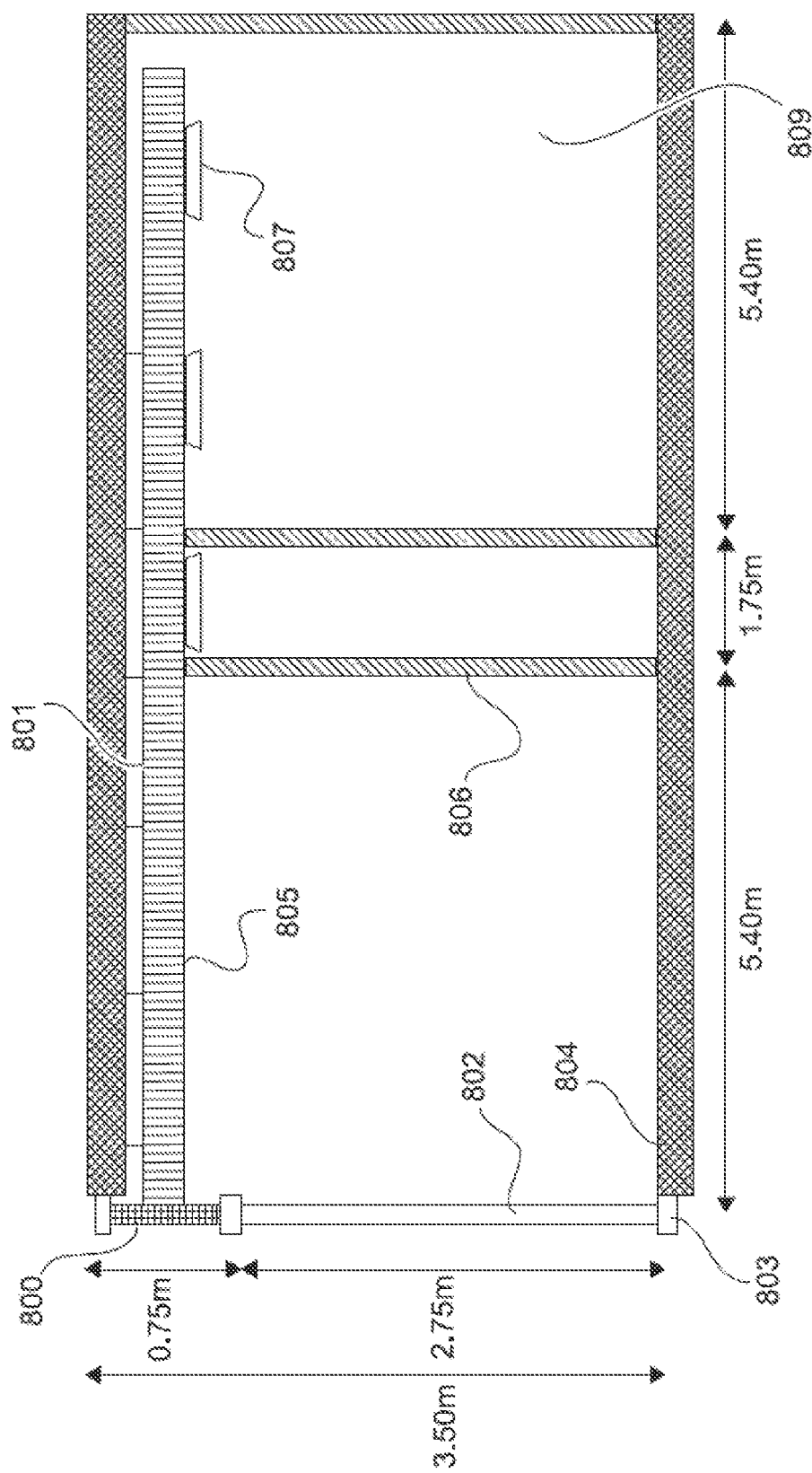

The light transport channel (FIG. 1a or 1b, foreseen for extending with its length l into the interior of the building) generally forms an angle of 45° or more with the exterior surface of the facade element (in FIG. 1a defined by its height h and width w); typically, the angle between the plain h×w and a long side of the light channel of length l is about 90°, thus realizing an about horizontal positioning. The facade element's height and width may be of about same dimension as the height and width of the light transport channel, as depicted in FIGS. 1a and 1b, or may be larger, as depicted in FIGS. 2, 3 and 4.

The thickness d of the facade element (800) may vary from 10 to 1000 mm, for example from 15 to 250 mm, preferably from 1 cm to 20 cm, more preferably from 2 cm to 15 cm.

According to an exemplary embodiment of the present invention, the present daylight illumination system comprises at least one polymer film, e.g. a coating or film laminated to at least one glass sheet of the transparent front plate or facade element (hereinafter also referred to as transparent panel), to control its reflection and transmission properties. For example, either of the transparent panels may comprise at least one coating or film laminated to it to control its reflection and transmission properties. It may e.g. comprise an antireflection coating or film and/or an IR reflection coating or film, and/or a low-E coating or film, and/or a UV reflection coating or film, and/or an IR absorbing coating or film, and/or a UV absorbing coating or film. It may also comprise a coating or film that selectively reflects or absorbs a narrow specific range of the light spectrum, i.e. a multilayer film or coating (such as a Bragg filter). The coating or film may be used to control the spectrum of light that is transmitted into the building. Preferably the visible light spectrum from 400-700 nm is transmitted through the coating or film. At least part of the IR radiation may be reflected or absorbed by the coating or film to keep heat outside the building during periods of high temperature and inside the building during periods of low temperature. At least part of the UV radiation may be reflected or absorbed to protect the interior of the building from harmful UV radiation. It may however be preferable to let at least parts of the UV-A radiation pass through the front plate to the inside of the building, where it can induce biosynthesis of vitamin A in the skin of human beings.

The present system can thus be integrated into a facade element to be used in a building. The system may preferably be constructed in the form of a modular system that can be integrated into the facade.

The system can be used for illumination of any kind of buildings. Preferably the system is used for illumination of large office buildings, hospitals, schools, or nursing homes.

According to another aspect of the present invention, a building is presented which comprises a daylight illumination as disclosed herein and an envelope with a facade in which the present front plate of the light channel is integrated as facade element.

The daylighting system comprises at least one mirror lined duct to transport the daylight from the front plate deep into the building. The mirror lined duct preferably may comprise a base material such as e.g. a metal (aluminum, steel) or a plastic as support. The inside of the mirror lined duct has a reflective surface. Any suitable reflector can be used in mirror-lined light ducts, including, for example metals or metal alloys, metal or metal alloy coated films, organic or inorganic dielectric film stacks, or a combination thereof. In some cases, mirror-lined light ducts can be uniquely enabled by the use of polymeric multilayer interference reflectors such as 3M optical films, including mirror films such as Vikuiti™ ESR film, that have greater than 98% specular reflectivity across the visible spectrum of light.

The reflecting layer in the present light transport channel typically shows an average reflectivity across the visible spectrum and all incidence angles (including diffuse reflectivity) of 96.5% or more, preferably of 97% or more, more preferably of 97.5% or more, and especially of 98% or more.

The invention thus further pertains to the use of a reflecting film providing a reflectivity, averaged over all angles of incidence, polarizations and wavelengths from the visible range, of 96.5% or more, preferably 97% or more, and especially 97.5% or more, for lining the inner walls of light transport tube (801) having a length of 5 to 20, especially 6 to 12, meter, thus obtaining the mirror lined duct described below in more detail, and which is suitable for horizontal integration into a building. Preferred is such use, where the reflecting film comprises a reflecting silver layer or a multitude of polymer layers, and the light transport tube has a width from the range of 0.1 m to 2 m, more preferably from 0.2 m to 1 m, and a height from the range 0.05 m to 1 m, preferably from 0.1 to 0.75 m.

Where multilayer optical film is used in any optical device, it will be understood that it can be laminated to a support (which itself may be transparent, opaque, reflective or any combination thereof) or it can be otherwise supported using any suitable frame or other support structure because in some instances the multilayer optical film itself may not be rigid enough to be self-supporting in an optical device.

The mirror lined duct may preferably have a rectangular or circular cross section area. The mirror lined duct may also have a triangular or pentagonal or hexagonal cross-section area or the like. Of special technical interest is a mirror lined duct, whose rear end is slanted, e.g. by 45° downwards, or rounded (e.g. in a linear parabolic shape), thus forming a mirror directing light towards one or more luminaires, as described for outcoupling elements further below.

The mirror lined duct is used to transport the daylight from the building envelope deep into the building. The mirror lined duct may have a broad variety of lengths and is preferably comprising modular elements that can be combined to any desired length. The mirror lined duct thus may have a length of 1 m to 40 m, preferably from 2 m to 20 m, more preferably from 4 m to 16 m. Of special technical interest is a mirror lined duct (light transport tube 801) having a length of 5 to 20 meter, especially 6 to 12 meter.

The mirror lined duct may be horizontally attached to the ceiling of a room. It may preferably be part of a suspended ceiling. Alternatively, the mirror lined duct may also be attached openly to the ceiling. The mirror lined duct may pass through openings in cross walls and thus connect several rooms within the same floor.

For instance, if the mirror lined duct has a rectangular shape, the width w may preferably be in a range of 0.1 m to 2 m, more preferably from 0.2 m to 1 m, even more preferably from about 0.3 m to 0.9 m. The height h of the duct is typically in a range from 0.05 m to 1 m, more preferably from 0.1 to 0.75 m. The mirror lined duct may also have a round shape. In this case the diameter of the duct may be in the range of 0.1 m to 2 m, preferably from 0.2 m to 1 m. Of special technical interest is a system whose mirror lined duct has a rectangular shape whose width w is about 0.9 m and whose height h is about 0.3 m.

In another preferred embodiment the mirror lined duct, e.g. comprising left and right wall and bottom and top sides in case of the preferred rectangular duct, may have a non-constant cross-section area in the part located close to the facade, i.e. the cross section area may be narrowing down over a distance of up to 2 m from the facade, preferably up to 1 m. This narrowing down of the duct results in a secondary light concentration effect. The duct structure can be narrowing down linearly, or it can be narrowing in a compound parabolic concentrator (CPC) type geometry (circular or rectangular) or the like. Within the narrowing section of a rectangular duct, the channel walls, bottom and/or top may deviate up to 30° from the general length of the channel, i.e. a narrowing bottom section may deviate up to 30° from the horizontal. The narrowing down is preferably effected in the vertical dimension (i.e. reducing the height of the channel) but can also be used for narrowing the width of the channel. The cross-section area of the mirror lined duct may thus be reduced by a factor of 1.05 to 10, preferably 1.2 to 5, more preferably 1.4 to 5 with light losses smaller than the increase of light flux through the reduced cross section. Reduction of the cross-section area results in lower material cost and lower space requirements for the transport system.

The mirror lined duct preferably transports the light in a linear direction from the facade to the interior of the building. The mirror lined duct may however also comprise bent elements that allow change of direction of the transport of light. Preferably the bent elements are only slightly bent in order to minimize light losses. The mirror lined duct may also split into two or more mirror lined ducts with a smaller cross section area after a certain distance.

The mirror lined duct may comprise a transparent element to separate fire zones, typically in a building, and comply with safety regulation. The separation element may for instance, but not exclusively, be any kind of antireflective coated glass pane with high transmittance. Preferably the usage of such separation element is avoided by placing a single mirror lined duct for one fire zone only.

The mirror lined duct may comprise an element to regulate the intensity of light transported. The regulating element may for instance, but not exclusively, be any kind of shutter or an electrochromic transparent window that allows regulation of the intensity of the light transported by the daylighting system.

The mirror lined duct may comprise at least one optical element to homogenize (mix) and/or partially diffuse the directional light which enters the mirror lined duct before it is coupled out of the duct for illumination in the building interior. The optical element to homogenize the light may be attached to the element that regulates the intensity of light transported, or it may be attached independently of the element that regulates the light intensity.

The mirror lined duct may comprise at least one artificial light source attached to it, preferably it is an LED light source. The artificial light source can be switched on in situations when the daylighting system does not deliver sufficient amount of daylight for room illumination. The artificial light source may be attached inside or outside the light tube. When attached inside, the luminaire defining the light distribution may be the mirror lined duct itself or an additional element coupled with the mirror lined duct.

The shutter mechanism to regulate the intensity of light transported and the artificial light source may individually be connected to a regulating system or may be connected to one common regulating system. The regulating system is preferably an automatic system connected with at least one sensor element. The at least one sensor element may e.g. comprise an occupancy sensor, a photometric sensor, an illuminance sensor, an irradiance sensor, and/or an imaging sensor. The sensor element may analyze the spectral composition of the light. The at least one sensor element may be wirelessly connected to the regulating system. The at least one sensor element may also control the additional artificial light source.

The light ducts may preferably be constructed in the form of a modular system that starts at the facade element and can be integrated in the ceiling or suspended ceiling of a floor thus extending into the depth of the building with appropriate modules selected depending on the specific needs of each room to be illuminated. The light duct may preferably be constructed from individual prefabricated modular light duct elements.

The daylighting system preferably comprises mechanical connection elements at the front plate or facade element foreseen as the channel attachment section, and at the open ends of the light duct modules which allow to easily assemble the complete system from individual modules.

In the following details and embodiments relating to the light distribution element are provided. In the context of the present invention the term light distribution element is used interchangeably with the luminaire or luminaire element.

In the interior of the building, the daylight is coupled out of the mirror lined duct through luminaire sections and distributed in the rooms for room illumination.

Luminaire sections may interrupt the mirror lined duct at the side(s) of the duct directed towards the interior of the room. Where the mirror lined ducts are horizontally suspended on the ceiling of a room, the luminaire section is preferably located at the part of the duct pointing towards the floor of the room.

The luminaire sections generally comprise an area of the mirror lined duct which is at least partially transparent for daylight, i.e. the specular reflective mirror is not covering the inside of the duct at all or is disrupted in the luminaire section. The luminaire section may comprise a transparent opening in the mirror lined duct through which the light is directed into the room to be illuminated. The transparent opening (light output surface) may preferably comprise a transparent plate, e.g. a glass plate or plastic plate (PMMA, poly carbonate or silicone) through which the light is redirected into the room. The transparent plate may be a flat plate or may be a 3D structure extending out of the mirror lined duct or into the mirror light duct. The 3D structure may have any geometrical shape, including (but not limited to) e.g a dome type shape, a triangular roof type shape, or a rounded vault type shape.

Attached to the at least one luminaire section may be an out-coupling element that redirects the light towards the room to be illuminated. The redirecting element may e.g. be a mirror type element protruding into the mirror lined duct or may be a transparent optical element, such as e.g. a prism, cone, or pyramid protruding into the mirror lined duct and redirecting the light by total internal reflection (TIR). The redirecting element may also be a micro-optical film laminated to the transparent plate in the luminaire opening. The redirecting element may also contain a light homogenizing (or mixing) functionality.

The at least one luminaire element may comprise attached light controlling (or steering) optical elements that distribute the redirected light after coupled out from the mirror lined duct in the room to be illuminated according to the specific needs of the room. The steering elements may be any optical elements fulfilling this task, such as e.g. lenses, reflector type elements, regularly or irregularly structured surface type elements, or micro-optical films.

The at least one luminaire may comprise a combination of a light redirecting element and a light steering element attached to it. Preferably the combination of a light redirecting element and a light steering element attached to it comprises two micro-optical films, i.e. a redirecting film and a steering film.

The at least on luminaire may also comprise a combination of the above with a clear, transparent part to preserve the directionality of sun light and enable light patches in the illuminated space, which move with changing position of the sun. Such moving light patches provide a connection with the exterior for the user and add an aesthetic feature. The clear part does not affect the direction or diffuseness of light in the light tube. This combination may be realized by the presence of square, round or otherwise shaped clear patches in the luminaire. The total surface fraction of clear area of the luminaire may be about 1/50, more preferably about one tenth. This combination may also be reached by a combination of luminaires some being clear, others not.

In one preferred embodiment, the luminaire element may include a steering film having a plurality of ridges adjacent to the redirecting film and opposite the light output surface, each ridge parallel to the longitudinal axis and disposed to refract an incident light ray from the redirecting film, wherein a light ray that exits the duct through the light output surface is redirected by the redirecting film within a first plane perpendicular to the light duct cross-section, and further redirected by the steering film within a second plane parallel to the light duct cross section. Redirecting films, steering films, and plurality of void configurations are further described, for example, in PCT Publication Nos. WO2014/070495 entitled CURVED LIGHT DUCT EXTRACTION, and WO2014/070498 entitled RECTANGULAR LIGHT DUCT EXTRACTION, the disclosure of which are both herein incorporated in their entirety.

The dimensions of luminaires may vary in a broad range and are limited only by the size of the mirror lined ducts. The dimensions of luminaires are selected according to the available light flux of the daylighting system and the illumination needs in the interior of the building.

The luminaire may extend as a single section along the complete length of the mirror lined duct or at the cross section end of the mirror lined duct, or two or more luminaires can be located along the mirror lined duct in separate sections. Preferably luminaire sections located near the end of the duct (i.e. in the depth of the building) may be larger than those close to the building envelope.

For rectangular shape light ducts, the luminaire section may preferably extend over the whole width of the duct or may only cover a part of the width, or may cover the whole width additionally including parts of the sidewalls. For circular shape ducts the luminaire section may cover less than half of the circumference of the duct or may cover as much as the whole circumference of the duct.

The light ducts may preferably be constructed in the form of a modular system extending into the depth of the building with appropriate modules including modules that comprise at least one luminaire section selected depending on the specific needs of each room to be illuminated. The light duct may preferably be constructed from individual prefabricated modular light duct elements including light duct elements that comprise at least one luminaire section.

In the northern hemisphere, the daylighting system may advantageously be applied to a south directing facade, an east directing facade, or a west directing facade. More generally speaking it may be applied to a facade pointing in any direction from east to south to west, more preferably in a direction pointing mostly towards south. In the southern hemisphere, it may be applied to a north directing facade, an east directing facade, or a west directing facade. More generally speaking it may be applied to a facade pointing in any direction from east to north to west, more preferably in a direction pointing mostly towards north.

Besides use in buildings, the present may be used for illuminating the interior of vehicles, typically larger vehicles such as ships or trains, especially where such vehicles comprise interior rooms without windows or with windows too small to provide sufficient daylight illumination. In the case of ships, such rooms must be positioned above sea level, but may be distant from the outer side wall of the vehicle as described for buildings above. Mounting of the light channel into the vehicle is analogous to the mounting into a building, i.e. typically under the room ceiling with the channel's front opening attached to an outside window of the vehicle. Advantageously, large vehicles for passenger transport or recreation may be equipped with the present daylight illumination system, for example cruise ships. The present invention thus further relates to a daylight illumination system for integration into a vehicle, the daylight illumination system comprising a light transport tube (801) for horizontal integration into the vehicle, the light transport tube having a front end and a rear end, wherein the rear end is sealed, the inner walls including the rear end are equipped with a reflecting layer (808), and a side wall contains one or more openings each of which is sealed with a luminaire (807), characterized in that the reflecting layer (808) provides a reflectivity, averaged over all angles of incidence, polarizations and wavelengths from the visible range, of 96.5% or more, and the open front end is suitable for attaching to the inner side of a flat transparent wall element (800) of the vehicle, or the front end is sealed to a transparent front plate (800) suitable for integration into the outer vehicle wall. The wall element is typically a window or part of a window of the vehicle.

The invention thus further pertains to a vehicle comprising a daylight illumination system as described above, and an outer wall comprising a translucent or transparent wall element, to which the present light transport channel is attached in about horizontal positioning, preferably under the ceiling of one or more rooms within the vehicle.

These and other features of the invention will become apparent from and elucidated with reference to the embodiments described hereinafter.

DESCRIPTION OF EMBODIMENTS SHOWN IN FIGURES

FIG. 1a schematically shows the present daylight illumination system for integration into the building with a transparent front surface (h×w) according to the present invention. The light transport channel (rectangular light tube) of length l, width w and height h (in the example: h=0.3 m, w=0.9 m, l=11 m) is sealed from inside to the facade element having a width of at least w and a height of at least h. The façade element may be a window with standard double or triple glazing.

FIG. 1b gives a schematic side view of a mirrored light transport channel 801, 808 of length l and rectangular cross section of height h with transparent front plate 800, whose rear end comprises a mirror inclined by 45°, thus guiding incoming light towards the luminaire opening 807.

FIG. 2 schematically shows the side view of the present daylight illumination system comprising a rectangular light tube of height h with its light entry side 801 (left side of the figure) attached to the transparent front plate 800, rear side 811 (right side of the figure) containing a luminaire 807, reflective layer 808 (dashed line) covering the light tube's inner walls and rear end; possible light paths 812 are indicated by dotted lines (reflection on rear end 813 omitted).

FIG. 3 schematically shows a front view of the facade element 700, 705 comprising two at least partially transparent sections with 2 light channels 701, 702 attached to the interior there. Typically, the height (703, 704, A, B) of the façade element is larger than the channel height, in this example specified as 0.3 m. Further specific dimensions of an individual exemplary embodiment of the assembly are shown in FIG. 3.

FIG. 4 shows a section of a building with a daylight illumination system according to the present invention. The daylight illumination system comprises a front plate (as a facade element) 800 and a light transport channel (light tube) 801. The light transport channel is for guiding light from an outside of the building to an interior of the building. The light transport channel 801 comprises walls which provides for internal reflection to guide the light from the front plate 800 towards the desired section 809 of the building (e.g. a separate room). In FIG. 4, the light transport channel is embodied as a mirrored horizontal light tube 805. Also, a light distribution element 807 in form of the daylight luminaire is shown. The building of FIG. 4 also comprises a window 802, several walls 806, frame 803 and the floor 804.

Figure 5:
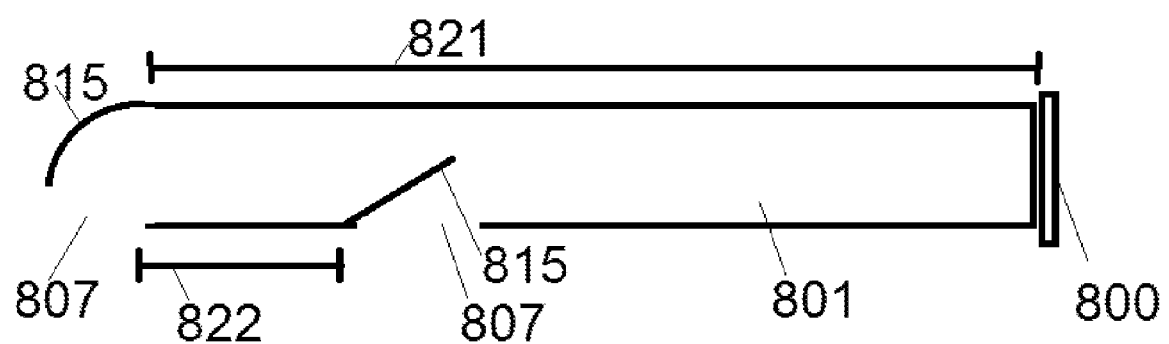

FIG. 5 shows the cross section (side view) of the prototype light channels of example 3 lined with high reflective film (not shown in the figure); 800 denotes the insulating glass unit of the façade (front side; 4 mm glass sheet, 12 mm air gap, 4 mm glass sheet); 801 denotes the volume of the light channel; 807 denotes the 2 openings (Luminaires, side view showing their short side) the one at the channel end sized 29 cm×83 cm and the one towards the middle of the channel sized 30 cm×80 cm; 815 denote the rounded reflector at the end of the tube (radius 29 cm) and the reflective sheet over the middle luminaire; 821 indicates the straight tube length of 11.1 m; 822 indicates the distance between the 2 luminaire openings of 2.8 m.

ABBREVIATIONS USED IN THE SPECIFICATION OR CLAIMS

PMMA the acrylic polymer Polymethylmethacrylate
PET the polyester Polyethyleneterephthalate
PVB the polymer Polyvinylbutyral
LED light emitting diode

EXAMPLE 1

Model Channel

A rectangular model light channel in scale 1:10 with clear glass as front plate and open rear end is of height 3 cm, width 9 cm and length 110 cm. This model system has the same optical properties, including light flux at rear end, as the same system upscaled to a height of 30 cm, width of 90 cm and length of 11 m, or such system (as shown in FIG. 1b) equipped with a 45° mirror in rear end directing light towards the opening/luminaire inserted rectangularly to the front plate into the bottom of the light channel. The following materials are used as reflecting layer 808 covering the channel's inner walls including the rear end (where applicable):

MIRO-SILVER® 27 («M27»; manufactured by Alanod, Ennepetal, Germany) comprises a silver layer bonded to an aluminum base material and covered by reflection enhancing oxide layers (manufacturer's data: diffuseness <6%; reflectivity 98% or more).

Commercial multilayer reflecting film («3M»; manufactured by 3M).

3M Specular Film DF2000MA («DF2000MA»; manufactured by 3M) comprises a metal-free multilayer polymer film (manufacturer's data: reflectivity >99% and reflected color/shift CIE u, v less or equal 0.002 [ASTM E1164/E108]).

Light source is artificial sunlight (LED lighting system) as described by Darula Stanislav et al., Applied Mechanics and Materials 861, 469 (2017).

For comparison purposes, light flux is calculated assuming specular reflection at inner walls with reflectivity 97% over all incidence angles in the same light channel.

The light flux is determined at the rear end of the model channel; results are compiled in Table 1.

TABLE 1

| Light flux (in % of incoming light) at channel end, depending on incidence angle | | | | |
|---|---|---|---|---|
| Sun angle | Calculated (comparison) % | M27 % | 3M % | DF2000MA % |
| 70° | 4.8 | 11 | 35 | 47 |
| 50° | 26.3 | 32 | 53 | 68 |
| 35° | 45.9 | 46 | 70 | 72 |
| 30° | 52.8 | 54 | 68 | 79 |
| 20° | 65.9 | 63 | 76 | 82 |

Light transport in the channel is surprisingly efficient even at high sun angles.

EXAMPLE 2

Average Light Flux (Office Hours) at Varying Latitudes

Average light flux at the rear end (l=11 m) of a south facing horizontal light channel of h=0.3 m and w=0.9 m as shown in FIG. 1b, during standard office hours between 8 am and 5 pm is calculated for sky conditions found in Frankfurt a.M. (35% sunshine hours), Madrid and Abu Dhabi (based on public climate data: https://enerqyplus.net/weather).

For the simulation, a raytracing tool (LightTools 8.5, Synopsis' Optical Solutions Group, Pasadena, US) is used to characterize the system, assuming a reflectivity of 97% over all incidence angles. The system transmittance is characterized for each incoming angle of the hemisphere with a resolution of 1° in elevation and 2° in azimuth. The transmittance is calculated between the front end of the duct and the rear end of the duct. This transmittance vector is then multiplied by the available luminance and solid angle for each direction at each time step. The sky luminance for each direction and over the whole year is computed based on the Perez model using the direct and diffuse irradiance from the hourly climatic data. Both the luminance for the sky and the ground (albedo of 30%) are considered. Hereby, the hourly light flux at the end of the system is computed.

Table 2 compiles results (in lumen) for the average light flux during office hours (Average) and for the minimum light flux during 50% of office hours (Minimum, i.e. during 50% of working hours, the light flux at the end of the duct will be equal to or higher than the given value).

TABLE 2

| Average light flux (lm) and minimum light flux (lm) after 11 m transport length | | | |
|---|---|---|---|
| | Frankfurt | Madrid | Abu Dhabi |
| Average | 4300 | 5900 | 6000 |
| Minimum | 3450 | 5050 | 4850 |

EXAMPLE 3

Full Scale Prototype

In order to further validate the simulation results of example 2, a 1:1 prototype is built. The prototype consists of two offices and two light tubes. Both offices are windowless and illuminated by one opening in each tube, they are 2.8 m wide and 3 m long with a ceiling at 2.6 m. The rooms are painted white and furnished with a table and chairs. The tubes both have a rectangular cross section with interior dimension of 29 cm height and 87 cm width. The tubes are both 11.39 m long in total and placed in parallel with some space between them. One is fitted with a 3M DF200MA reflective foil and one with a Alanod Miro Silver DL reflective metal foil. All four openings in the bottom surface of the 2 tubes providing light to the rooms are offset by 14.5 cm with respect to the ceiling. The 14.5 cm distance between the room ceiling and the tube opening in each case is fitted with a reflective foil. The openings of each tube into the first room is sized 30×80 cm, starting at 8 m from the façade, and in the second office 29×83 cm and located at 11.1 m from the façade, at the very end of the tube (short length of the opening in direction of the tube length). The tube is ending with a quarter circle shaped reflector above the opening at the end of the tube, with a radius of 29cm (see FIG. 5). Above the first opening a reflective sheet is placed with an angle of 29° from the horizontal and a length of 27.8 cm to capture light from the tube and redirect it. The vertical openings on the front, façade side, are fitted with a simple plexiglass and then with a double glazing (4-12-4). Field measurements are performed in Austria with façade facing south. Photos of the 1st room taken at fixed times on Sep. 21, 2017, are evaluated to quantify the light intensity on the workplace; results are shown in Table 3.

TABLE 3

| Illuminance on the office desk in the front room derived from the illuminance; measurement performed on Sep. 21, 2017. | | | | | |
|---|---|---|---|---|---|
| | Time of day | | | | |
| | 10:00 | 11:00 | 12:00 | 13:00 | 14:00 |
| Illuminance (lux) | 313 | 766 | 1045 | 832 | 785 |

The invention claimed is:

1. Daylight illumination system comprising a light transport tube (801) for horizontal integration into a building or vehicle, the light transport tube having a front end and a rear end, wherein the rear end is sealed, the inner walls including the rear end are equipped with a reflecting layer (808), and a side wall contains one or more openings each of which is sealed with a luminaire (807), characterized in that the reflecting layer (808) provides a reflectivity, averaged over all angles of incidence, polarizations and wavelengths from the visible range, of 96.5% or more, and the open front end is suitable for attaching to the inner side of a flat transparent facade element (800) of the building or wall element of the vehicle while in a horizontal position, or the front end is sealed to a transparent front plate (800) configured for integration into the building's façade or vehicle wall without protruding outwardly from the building's façade or vehicle wall and wherein the flat transparent façade element or wall element or front plate is oriented essentially parallel to the façade or wall.

2. Daylight illumination system of claim 1 wherein the light transport tube (801) is for horizontal integration into a building, wherein the open front end is suitable for attaching to the inner side of a flat and transparent facade element (800) of the building, or the front end is sealed to a transparent front plate (800) suitable for integration into the building's facade.

3. Daylight illumination system according to claim 2, wherein the transparent facade element (800) comprises an insulating glazing unit containing at least 2 parallel glass sheets and at least one polymer film, wherein the total thickness of the facade element (800) is from the range 10 to 1000 mm.

4. Daylight illumination system of claim 3, wherein the total thickness is from the range 15-250 mm.

5. Daylight illumination system of claim 1, wherein the front end and the one or more openings sealed with a luminaire (807) in the light transport tube (801) are arranged in a way that the cross-sectional area of the front end suitable for sealing, or sealed, to the front plate (800), and the cross-sectional area of the one or more openings sealed with a luminaire (807), form about a right angle.

6. Daylight illumination system of claim 1, wherein the reflecting layer (808) provides a reflectivity, averaged over all angles of incidence, polarizations and wavelengths from the visible range, of 97% or more.

7. Daylight illumination system of claim 6, wherein the reflectivity is 97.5% or more.

8. Daylight illumination system of claim 7, wherein the reflectivity is 98% or more.

9. Daylight illumination system of claim 1, wherein the light guiding inner walls of the light transport tube (801) are covered by a reflective silver or aluminum layer or a reflective multilayer polymer film providing at least 95% directed reflection and less than 5% diffuse reflection.

10. Daylight illumination system according to claim 1, wherein the reflecting layer used in the present light transport tube provides reflectivity with low color shift characterized by a Fidelity Index Rf of 90 or more, and a Gamut Index Rg from the range 95 to 105 in accordance with IES TM-30-15.

11. Daylight illumination system according to claim 1, wherein the cross section of the light transport tube (801) has a height from the range 8 to 50 cm; has a width from the range 20 to 300 cm; and the length of the light transport tube (801) is from the range 500 to 2000 cm.

12. Daylight illumination system according to claim 11, wherein the light transport tube (801) has a rectangular cross section, and a height of about 30 cm and a width of about 90 cm.

13. Method for improving the light quality in a building or vehicle by increasing the amount of daylight brought into the building or vehicle, characterized in that a daylight illumination system according to claim 1 is integrated into an envelope of the building or vehicle wall; providing a reflecting film providing a reflectivity, averaged over all angles of incidence, polarizations and wavelengths from the visible range, of 96.5% or more, for lining the inner walls of light transport tube (801) having a length of 5 to 20 meter, which light transport tube is suitable for horizontal integration into a building or vehicle and wherein the cross section of the light transport tube has a height from the range 8 to 50 cm; has a width from the range 20 to 300 cm; and the length of the light transport channel tube is from the range 500 to 2000 cm.

14. The method of claim 13, wherein the reflectivity is 97% or more, and the length is 6 to 12 meter.

15. The use of claim 14, wherein the reflectivity is 97.5% or more.

16. Daylight illumination system of claim 11, wherein the height is from the range 10 to 35 cm, the width is from the range 30 to 120 cm, and the length is from the range 600 to 1200 cm.

17. Daylight illumination system according to claim 1, wherein the cross section of the light transport tube (801) is rectangular or circular or triangular or pentagonal or hexagonal.

18. Daylight illumination system of claim 17, wherein the light transport tube (801) has a rear end which is slanted downwards.

19. Daylight illumination system according to claim 1 further comprising an artificial light source.

20. Daylight illumination system of claim 19, wherein the light source is a LED light source.

21. Building or vehicle comprising
a daylight illumination system according to claim 1, characterized in that an envelope of the building's with its facade comprises the attached light transport tube (801) integrated as a facade element, or
the vehicle's outer wall comprises a translucent or transparent wall element, to which the present light transport channel's front end is attached in about horizontal positioning and its rear end reaches towards the vehicle's interior.

22. Method for improving the light quality in a building or vehicle by increasing the amount of daylight brought into the building or vehicle, characterized in that a daylight illumination system according to claim 1 is integrated into an envelope of the building or vehicle wall introducing daylight into the interior of the building or vehicle in 5 to 20 meter distance from a window.

23. The method of claim 22, wherein the distance is 6 to 12 meter.

24. Method for improving the light quality in a building or vehicle by increasing the amount of daylight brought into the building or vehicle, characterized in that a daylight illumination system according to claim 1 is integrated into the building envelope or vehicle wall, with its light transport channel aligned about horizontally away from the building's facade or outside wall of the vehicle without protruding outwardly from the building's façade or vehicle wall and wherein the flat transparent façade element or wall element or front plate is oriented essentially parallel to the façade or wall.

* * * * *